United States Patent Office 2,793,398
Patented May 28, 1957

2,793,398

PREPARATION OF UREA IN GRANULAR FORM

Gerardus Hallie and Johan W. Hoogendonk, Geleen, Netherlands, assignors to Stamicarbon N. V., Heerlen, Netherlands No Drawing. Application August 30, 1955,
Serial No. 531,613

Claims priority, application Netherlands July 16, 1954

7 Claims. (Cl. 18—47.2)

The present application is a continuation-in-part of our copending application, Serial No. 521,405, filed July 11, 1955, and now abandoned.

The present invention relates to the preparation of urea granules by causing a highly concentrated urea solution, e. g., a concentrated aqueous solution (95% or over of urea), or of molten urea in the form of drops, to fall through a column of thin mineral oil, preferably transformer oil, at a temperature below the solidification point of the urea drops, so that the drops, during their fall, solidify into granules; the temperature of the oil being about 75° C., i. e., considerably lower than the solidifying point of the urea. The granules are then removed from the column of oil by means of an oil lift and conducted across a screen plate, through which the greater part of the oil can drain off, after which the granules are finally centrifuged. It has, hitherto, been found that, if the granules are vigorously centrifuged and they are not too small, but have a diameter of, for example, 2 mm., the oil remaining in the granules after centrifuging, 1 to 1.5% of the granule weight, does not cause difficulties. Though the centrifuged granules, at first, feel slightly greasy, they come to feel dry when stored, as the remaining oil is then absorbed by the granules, so that the granules, when strewn on paper, do not form grease spots.

However, if the oil content of the granules is to be decreased to the necessary low value of 1.5% or lower, very prolonged and intense centrifuging is required in such prior art processes.

It has now been found possible to produce a dry non-greasy product even if the granules retain 2 to 2.4% of mineral oil, thereby enabling centrifuging to be cut down considerably.

The present invention is directed to an improvement in the method of preparing urea in granular form by causing a highly concentrated aqueous solution of urea or molten urea in the form of drops to fall through a column of thin mineral oil at a temperature below the solidification point of the urea drops. The improvement includes adding to the mineral oil an amount of wax modifier, as hereinafter defined, which will form an unctuous mass at 25° C., but a completely homogeneous highly fluid liquid at 75° C.

The term "wax modifier," as used above and further in this specification and the appended claims, is intended to denote a wax or wax-like substance which is an oily liquid at the temperature of molten urea, but which is a solid at temperatures of 50° C. or below. Typical examples of materials within this class are paraffin wax and stearic acid. Paraffin wax is the preferred wax modifier of the present invention.

If hard paraffin wax or stearic acid is employed as the wax modifier, it should be added to the mineral oil in a ratio of from 1:3 to 1:5, to fulfill the above conditions.

In general, the mixture of thin mineral oil and wax modifier should contain at least 15% by weight of the latter. The use of over 25% by weight of the wax is excessive in that, from a technical point of view, no advantage whatever is gained, and, in view of the price of the wax modifier, as compared with that of the mineral oil, it is not economical.

At about 75° C., the mixtures of mineral oil and wax modifier are sufficiently fluid and have sufficient heat conductivity, so that the drops of urea can quickly pass down through the liquid and, in passing, solidify into granules.

In centrifuging the granules, it has been found that the oil, which has become more viscous, due to the addition of the wax modifier, can now be flung off more easily, as the liquid shows less tendency to be quickly absorbed by the granules.

The mixture of mineral oil and wax modifier remaining after centrifuging can be as high as 2 to 2.4% of the granule weight, without causing the granules to feel greasy to the touch. Without addition of the wax modifier to the mineral oil, the granules containing such a percentage of oil would retain a distinctly greasy feel, even after storage. While the invention is not dependent on any theory as to the function of the wax modifier, it appears that the amount of mineral oil and wax modifier retained on and in the granules divides so that the liquid oil is absorbed by the granule, whereas the wax modifier forms a film around the granule.

Apart from the reduction in the centrifuging required, the urea granules obtained by the process according to the invention become exceptionally resistant to the influence of humidity and temperature variations as a result of the presence of this film.

Throughout the specification and claims, unless otherwise indicated, all percentages and parts are by weight.

Example 500 kg. per hour of molten urea (temperature 135° C., moisture content of the urea 0.37%) were allowed to drop in the form of jets from a rotating delivery cup (98 R. P. M.) onto the surface of a liquid cooling mixture consisting of 4 parts of transformer oil and one part of hard paraffin wax having a melting point of 52° C. The temperature of this cooling liquid mixture of oil and wax was kept at 80° C. The delivery cup had a diameter of 240 mm. and was provided with 66 peripheral apertures of 1.5 mm. diameter.

Due to the impact with the liquid surface, small portions were successfully cut-off from the urea jets and alowed to descend through the cooling liquid while assuming a globular form. The globules, after descending through the cooling liquid for a distance sufficient to solidify the same, were removed from the cooling liquid, conducted across a screen plate through which the greater part of the adhering liquid could drain off, after which the granules were finally centrifuged in conventional fashion. After centrifuging, the transformer oil-paraffin wax mixture remaining in the urea granules amounted to 2.05%.

Sieve analysis of the urea granules obtained was as follows:

| Diameter, mm.: | Percent |
|---|---|
| >3.4 | 2 |
| 3.4–2.8 | 15.5 |
| 2.8–2.4 | 30.5 |
| 2.4–2.0 | 24.5 |
| 2.0–1.4 | 9.5 |
| 1.4–1.0 | 6 |
| <1.0 | 2 |

We claim:
1. In the method of preparing urea in granular form by causing a member of the group consisting of highly concentrated aqueous urea solution and molten urea in the form of drops to fall through a column of thin mineral oil at a temperature below the solidification point of the urea drops, the improvement which comprises adding to the said mineral oil at least 15% by weight of a wax, said wax being capable of forming an unctuous mass at 25° C. but being a completely homogeneous highly fluid liquid at 75° C. and thereafter centrifuging the urea until the oil content is less than about 2.4%.

2. A process according to claim 1, wherein the wax added is paraffin.

3. A process according to claim 1, wherein the wax added is stearic acid.

4. A process according to claim 1, wherein the wax is paraffin and is present in amount of one part for every 3 to 5 parts of mineral oil.

5. A process according to claim 1, wherein the wax is stearic acid and is present in amount of one part for every 3 to 5 parts of mineral oil.

6. A process according to claim 1 wherein the centrifuging is continued until the urea contains 2 to 2.4% of mineral oil.

7. A process according to claim 1 wherein the centrifuging is continued until the urea contains about 2.05% of mineral oil.

No references cited.